(12) United States Patent
Ekas

(10) Patent No.: US 9,718,194 B2
(45) Date of Patent: Aug. 1, 2017

(54) ROBOTIC GRIPPERS INCLUDING FINGER WEBBING FOR IMPROVED GRASPING

(71) Applicant: Paul Ekas, Redwood City, CA (US)

(72) Inventor: Paul Ekas, Redwood City, CA (US)

(73) Assignee: Paul Ekas, Redwood, CA (US)

( * ) Notice: Subject to any disclaimer, the term of this patent is extended or adjusted under 35 U.S.C. 154(b) by 0 days.

(21) Appl. No.: 15/261,690

(22) Filed: Sep. 9, 2016

(65) Prior Publication Data

US 2016/0375589 A1 Dec. 29, 2016

Related U.S. Application Data

(63) Continuation of application No. 14/833,904, filed on Aug. 24, 2015, now Pat. No. 9,446,513.

(60) Provisional application No. 62/165,074, filed on May 21, 2015, provisional application No. 62/165,080, filed on May 21, 2015, provisional application No. 62/087,664, filed on Dec. 4, 2014, provisional application No. 62/041,332, filed on Aug. 25, 2014.

(51) Int. Cl.
*B25J 15/08* (2006.01)
*B25J 15/00* (2006.01)
*B25J 9/10* (2006.01)
*B25J 15/10* (2006.01)

(52) U.S. Cl.
CPC ........... *B25J 15/0009* (2013.01); *B25J 9/104* (2013.01); *B25J 15/10* (2013.01); *Y10S 901/21* (2013.01)

(58) Field of Classification Search
CPC ... B25J 15/08; B25J 15/10; B25J 15/12; B25J 15/0009; B25J 15/0028; B25J 15/0033; B25J 11/0045; B25J 9/1045; Y10S 901/21; Y10S 901/30; Y10S 901/39
See application file for complete search history.

(56) References Cited

U.S. PATENT DOCUMENTS 3,322,455 A 5/1967 Arthur
3,954,194 A 5/1976 Stedman
(Continued)

FOREIGN PATENT DOCUMENTS

JP 2010110846 5/2010
JP 2005351476 12/2015
(Continued)

OTHER PUBLICATIONS

Korean Intellectual Property Office, International Search Report issued in PCT/US2015/046596, Oct. 29, 2015, 3 pages.
(Continued)

*Primary Examiner* — Dean Kramer
(74) *Attorney, Agent, or Firm* — Leech Tishman Fuscaldo & Lampl; Kenneth D'Alessandro, Esq.

(57) ABSTRACT

A robotic gripper includes a gripper palm, a first pair of adjacent fingers extending from the palm, each finger in the first pair of fingers including a first link coupled to a second link by a rotatable joint, and a second pair of adjacent fingers extending from the palm, each finger in the second pair of fingers including a first link coupled to a second link by a rotatable joint. A web member is attached to the first pair of adjacent fingers, the web member having a web portion having a gripping face, the web portion disposed between a first one of the first pair of adjacent fingers and a second one of the second pair of adjacent fingers.

12 Claims, 6 Drawing Sheets

(56) References Cited

U.S. PATENT DOCUMENTS

| | | | |
|---|---|---|---|
| 4,403,801 A * | 9/1983 | Huff | B25J 15/0023 294/119.3 |
| 4,592,581 A | 6/1986 | Howard et al. | |
| 4,804,220 A | 2/1989 | Rosheim | |
| 5,570,920 A | 11/1996 | Crisman et al. | |
| 6,247,738 B1 | 6/2001 | Winkel et al. | |
| 7,955,042 B2 | 6/2011 | Sugahara et al. | |
| 8,157,308 B2 * | 4/2012 | Pedersen | B65G 47/90 294/106 |
| 9,446,513 B2 * | 9/2016 | Ekas | B25J 15/0009 |
| 2005/0102037 A1 | 5/2005 | Matsuda | |
| 2005/0218679 A1 | 10/2005 | Yokoyama et al. | |
| 2006/0131908 A1 | 6/2006 | Tadano | |
| 2006/0142102 A1 | 6/2006 | Radocaj | |
| 2009/0018670 A1 | 1/2009 | Puchhammer | |
| 2010/0061835 A1 | 3/2010 | Sim | |
| 2011/0068595 A1 | 3/2011 | Ihrke et al. | |
| 2012/0186383 A1 | 7/2012 | Schvalb et al. | |
| 2013/0154294 A1 | 6/2013 | Shiomi | |
| 2014/0097631 A1 | 4/2014 | Ciocarlie et al. | |

FOREIGN PATENT DOCUMENTS

| | | |
|---|---|---|
| KR | 101117253 | 3/2012 |
| KR | 101186806 | 9/2012 |
| WO | 8404722 | 6/1984 |
| WO | 03/013783 | 2/2003 |
| WO | 2009/080373 | 7/2009 |

OTHER PUBLICATIONS

Korean Intellectual Property Office, Written Opinion issued in PCT/US2015/046596, Oct. 29, 2015, 12 pages.

Korean Intellectual Property Office, International Search Report issued in PCT/US2015/046599, Nov. 3, 2015, 3 pages.

Korean Intellectual Property Office, Written Opinion issued in PCT/US2015/046599, Nov. 3, 2015, 10 pages.

Korean Intellectual Property Office, International Search Report issued in PCT/US2015/046603, Oct. 22, 2015, 3 pages.

Korean Intellectual Property Office, Written Opinion issued in PCT/US2015/046603, Oct. 22, 2015, 9 pages.

Korean Intellectual Property Office, International Search Report issued in PCT/US2015/046606, Nov. 3, 2015, 3 pages.

Korean Intellectual Property Office, Written Opinion issued in PCT/US2015/046606, Nov. 3, 2015, 8 pages.

Korean Intellectual Property Office, International Search Report issued in PCT/US2015/046780, Nov. 3, 2015, 3 pages.

Korean Intellectual Property Office, Written Opinion issued in PCT/US2015/046780, Nov. 3, 2015, 17 pages.

* cited by examiner

ROBOTIC GRIPPERS INCLUDING FINGER WEBBING FOR IMPROVED GRASPING

This application is a continuation of U.S. patent application Ser. No. 14/833,904 for "Robotic Grippers Including Finger Webbing For Improved Grasping", filed Aug. 24, 2015 which claims the benefit of U.S. Provisional Patent Application No. 62/041,332 for "Cable Guide System for Robotic Mechanical Manipulator Structure," filed Aug. 25, 2014; Provisional Patent Application No. 62/087,664 for "Tendon Configuration for Under-Actuated Robotic Manipulator With Progressive Wrapping Links," filed Dec. 4, 2014; Provisional Patent Application No. 62/165,080 for "Tendon Configuration for Under-Actuated Robotic Manipulator With Progressive Wrapping Links," filed May 21, 2015; and Provisional Patent Application No. 62/165,074 for "Apparatus and Method for Attaching Apparatus to Robotic Fingers," filed May 21, 2015 the contents of which are incorporated herein by reference in their entirety.

BACKGROUND

Field of the Invention

The present invention relates in general to mechanical robotic grippers. More particularly, the present invention relates to appendages for use in robotics applications and to apparatus and methods for improved grasping by robotic fingers.

The Prior Art

The mechanical robotic grippers of an industrial robot often utilize "fingers" assembled from links and joints as the primary grasping mechanism of the manipulator. When a robotic gripper grasps an object, it places its fingers onto the object with the intent to secure a good grasp. A challenge in robotic grasping systems is to obtain a good grasp on an object so that it is stable and does not slip while being grasped.

One aspect of the challenge for achieving a good grasp is the high computational complexity involved in identifying how to grasp an object. Placing the "fingers" onto the object in the correct locations to achieve good stability requires computing the positions of multiple joints of the robotic gripper so that there is an adequate surface contact and complementary forces to achieve a stable grasp.

Another challenge in achieving a good grasp is the mechanical complexity of having many independently motorized joints. This increases weight, cost and reliability challenges in the robotic grippers.

A class of robotic grippers has been previously implemented that provide a significant reduction in both the computational complexity and mechanical complexity of robotic grippers while still achieving a good grasp on objects. This class of robotic grippers is known as under-actuated robotic grippers. The key attribute of under-actuated robotic grippers is that multiple joints of the robotic gripper are dependent on a single actuator and provides a finger wrapping action onto objects to achieve high quality grasps. This operating modality requires less computational processing to define the grasp as compared to fully articulated robotic grippers.

Another challenge with robotic grippers is providing a grasp configuration that can allow multiple fingers to grasp objects having different sizes and shapes. A simple example is a robotic gripper that needs to pick up both a large ball, such as a softball and a small ball such as a golf ball or ping-pong ball or another relatively small object. To optimally grasp each of these objects, the fingers of the robotic gripper will need a wider placement for the large ball and a narrower placement for the small ball. Robotic grippers have been developed that are able to adjust their finger spacing to accommodate these types of differences, but with a trade-off in increased weight, complexity, and cost, as well as reduced reliability.

SUMMARY

According to a first aspect of the invention, in a robotic gripper with "fingers" a web in the form of, for example, a flexible membrane or sheet, or a grid-like structure, is provided between the fingers (webbed fingers).

According to a second aspect of the invention, the web can be spread across more than two fingers. According to one embodiment of the invention, the web is spread across two pairs of two adjacent fingers where both sets of adjacent fingers have membrane between them.

According to a third aspect of the invention, the web can be applied across the full range of fully articulated and under-articulated fingers.

According to a fourth aspect of the invention, a range of materials can be utilized to implement the web. According to one embodiment of the invention, the web is in the form of a membrane fabricated from an elastomeric material such as a rubber sheet and may have a gripping surface on the palm side.

According to a fifth aspect of the invention, a variety of methods may be used to attach the web to the robotic gripper. According to one embodiment of the invention, the web is implemented as a glove that slides onto the robotic gripper and is replaceable.

According to a sixth aspect of the invention, the web can be shaped to achieve different grasp advantages. According to one embodiment of the invention, the web fully encloses the space between the adjacent fingers and has a linear shape connecting the adjacent fingertips.

According to a seventh aspect of the invention, the conforming properties of the web may be non-uniform. According to one embodiment of the invention, the web is provided with a stiff edge between the tips of the fingers while the rest of the web is more flexible. This is useful when picking up small objects between the adjacent fingers, for example a marble.

BRIEF DESCRIPTION OF THE DRAWING FIGURES

DETAILED DESCRIPTION

Persons of ordinary skill in the art will realize that the following description of the present invention is illustrative only and not in any way limiting. Other embodiments of the invention will readily suggest themselves to such skilled persons.

Figures 1, 2, 3:
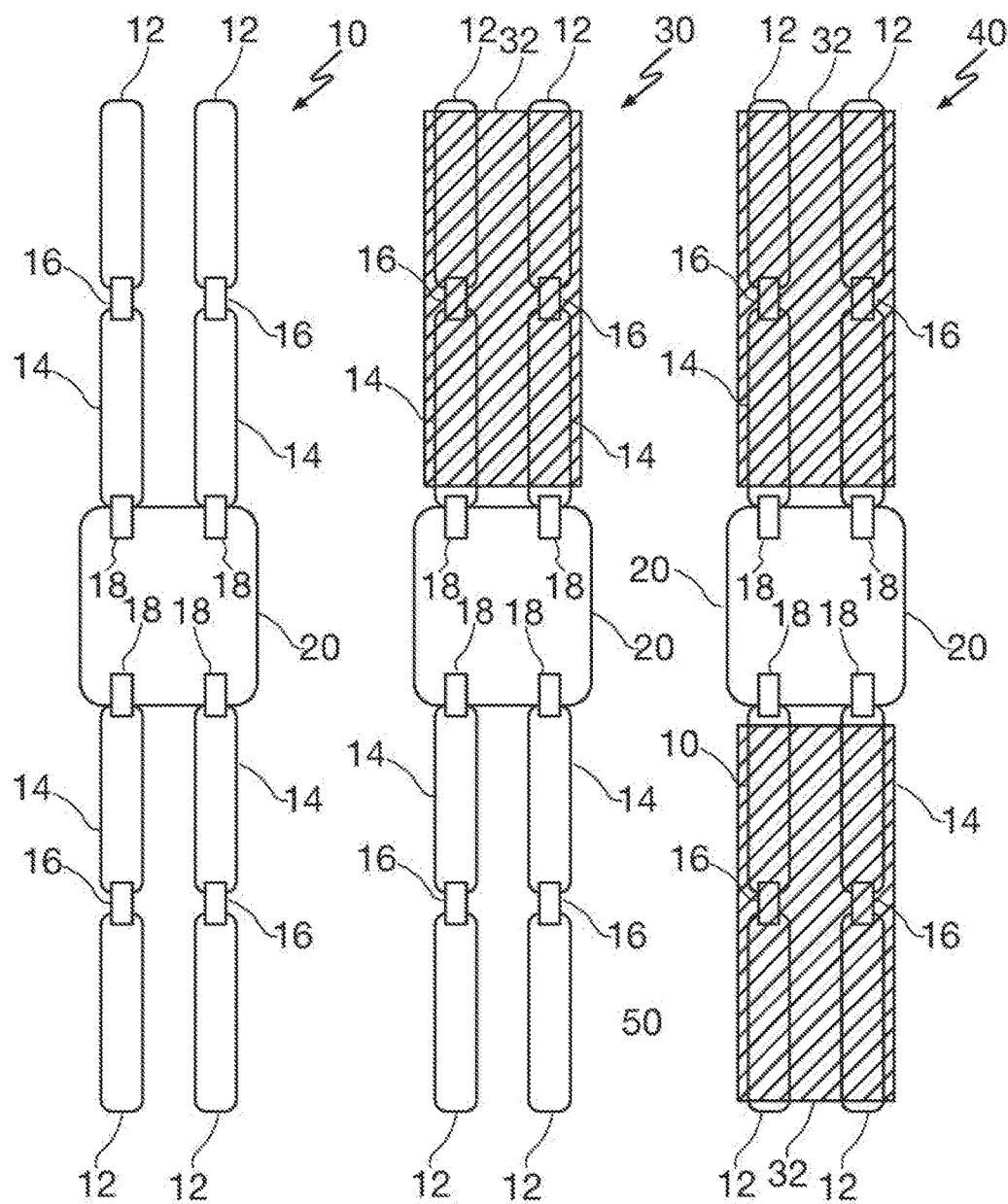
FIG. 1 is a diagram showing a prior art robotic gripper.
FIG. 2 is a diagram showing a robotic gripper having a web member spanning two adjacent fingers in accordance with one aspect of the invention.
FIG. 3 is a diagram showing a robotic gripper having a web member spanning two opposed pairs of adjacent fingers in accordance with another aspect of the invention.

Referring first to FIG. 1, FIG. 1 shows a side view of a prior-art robotic gripper 10 having opposed sets of two fingers each formed from links 12 and 14 coupled together by joints 16 and connected by a joint 18 to a robotic gripper palm or base 20. The robotic gripper 10 of FIG. 1 is satisfactory for its intended purpose but it is not particularly good at providing a grasp configuration that can allow multiple fingers to grasp objects having different sizes and shapes. A simple example is a robotic gripper that needs to pick up both a large ball, such as a softball and a small ball such as a golf ball or ping-pong ball or another relatively small object. To optimally grasp each of these objects, the fingers of the robotic gripper will need a wider placement for the large ball and a narrower placement for the small ball. Robotic grippers have been developed that are able to adjust their finger spacing to accommodate these types of differences, but with a trade-off in increased weight, complexity, and cost, as well as reduced reliability. Placing the fingers onto the object in the correct locations to achieve good stability requires computing the positions of multiple joints of the robotic gripper so that there is an adequate surface contact and complementary force to achieve a stable grasp.

Referring now to FIG. 2, a diagram shows a robotic gripper 30 similar to the robotic gripper shown in FIG. 1. Like robotic gripper 10 of FIG. 1, robotic gripper 30 has opposed sets of two fingers each formed from links 12 and 14 coupled together by joints 16 and connected by a joint 18 to a robotic gripper palm 20. While not necessary, it is particularly advantageous according to the present invention to employ an under-actuated robotic gripper. This type of gripper provides a significant reduction in both the computational complexity and mechanical complexity while still achieving a good grasp on objects. The key attribute of under-actuated robotic grippers is that multiple joints of the robotic gripper are dependent on a single control motor and provides a finger wrapping action onto objects to achieve high quality grasps. This operating modality requires less computational processing to define the grasp as compared to fully articulated robotic grippers.

Robotic gripper 30 of FIG. 2 is equipped with a web member 32 spanning two adjacent fingers in accordance with one aspect of the invention.

Referring now to FIG. 3, a diagram shows a robotic gripper 40 similar to the robotic gripper shown in FIG. 1. Like robotic gripper 10 of FIG. 1, robotic gripper 30 has opposed sets of two fingers each formed from links 12 and 14 coupled together by joints 16 and connected by a joint 18 to a robotic gripper palm 20. Robotic gripper 30 is equipped with a web member 32 spanning both sets of the two adjacent fingers in accordance with one aspect of the invention.

Figure 4:
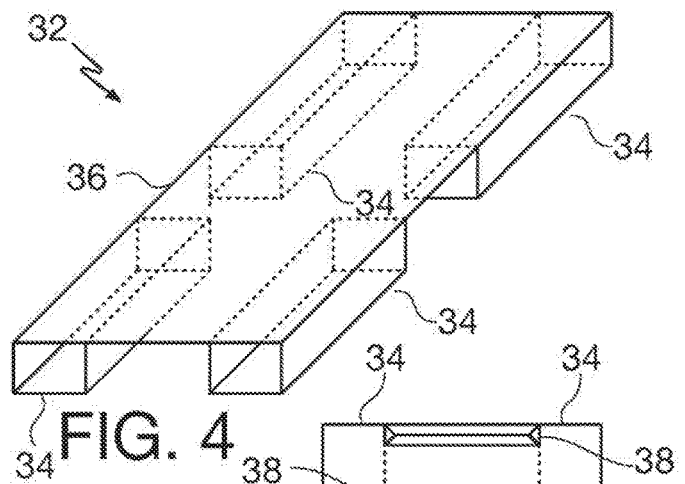
FIG. 4 is a diagram showing an isometric view of a web member for use with robotic fingers according to an illustrative embodiment of the invention.

Referring now to FIG. 4, a diagram shows an isometric view of a web member for use with robotic fingers according to an illustrative embodiment of the invention. In one illustrative embodiment of the present invention, web member 32 is formed from a sheet of an elastomeric material such as rubber. In another illustrative embodiment of the invention, web member 32 is formed from a material having a grid structure. In this embodiment, web member 32 is formed in the nature of a glove and includes mounting sleeves 34 for attaching the web to robotic fingers. Other attachment means, such as but not limited to mating tabs and slots, hook-and-loop fasteners, zip ties (sometimes referred to as "tie wraps"), etc., may be used to fasten the web member 32 between the robotic fingers. According to this feature of the invention, the web member 32 is easily replaceable.

The size of the inside diameter or other cross sectional area is selected to provide a snug fit over the links 12 and 14 that form the robotic fingers onto which it is to be installed without overly restricting movement of the fingers. A sheet or web 36 of the web member 32 disposed between the mounting sleeves 34. The spacing of the mounting sleeves may be selected based on the spacing between the adjacent fingers of the robotic gripper to which the web member is to be attached as well as the desired degree of at-rest tension, if any, desired for the sheet or web 36 when it is not grasping an object.

The choice of materials for the web member 32 depends on the application needs and could include requirements for various textures, durability, cost, weight, pliability, permeability, allergenic, temperature and chemical resistance. Examples include using soft material, such as, but not limited to, silk and lamb's wool, for touching humans, synthetic gripping material, such as 3M GM640 for warehouse pick and place, disposable latex gloves for hospital and food preparation. When under water, it is useful to use mesh fabrics that the water can flow through to minimize currents induced by the gripper movements. Across various industrial applications, the material of the webbing may need to be chemical proof such as Teflon 500 or temperature proof, such as leather for welding.

The pliability of the web member 32 can be optimized for different applications. When the objective is to equalize force distribution across the web and robot fingers, for example in picking up an egg, it is important that the material is stiff enough to transmit the force of the fingers across it onto the full surface of the object, and not exert the majority of the pressure on the egg through the fingers.

When the objective is to contain an object between the fingers and without much force, a very pliable material can be used, for example, when picking up a mouse. The mouse would be contained within the very pliable sheet or web 36 between the closed fingers. In this example, it would also be useful for the fabric to be breathable.

The web member 32 could be used for non-grasping purposes, such as sanding wood or scrubbing dishes. In this case, the surface of the sheet or web 36 could be made of abrasive materials.

Figure 5:
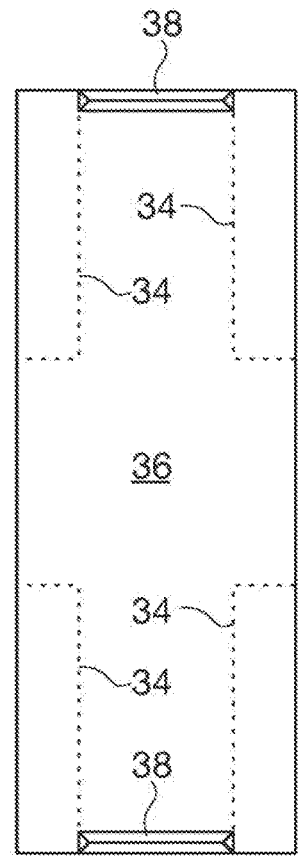
FIG. 5 is a diagram showing a view from the inside-facing surface of a web member for use with robotic fingers incorporating a stiffening member at its opposite ends according to an illustrative embodiment of the invention.
Figure 6:
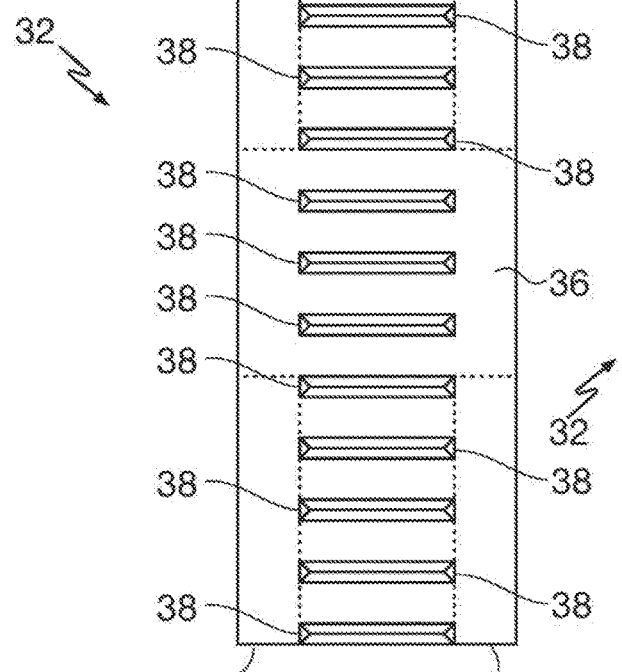
FIG. 6 is a diagram showing a view from the inside-facing surface of a web member for use with robotic fingers incorporating multiple stiffening members in the region between fingers according to an illustrative embodiment of the invention.

Referring now to FIGS. 5 and 6, web member 32 may include features on its gripping surface (i.e., its "palm facing" surface) to enhance gripping and durability. As a non-limiting example, referring to FIG. 5, a diagram shows a view from the inside-facing surface of a web member for use with robotic fingers incorporating stiffening members 38 at its opposite ends according to an illustrative embodiment of the invention. Stiffening members 38 may be integral with the sheet or web 36, formed for example, by providing a mold including thicker features at the ends of the sheet or web 36, or may be otherwise attached to the sheet or web 36. Providing a stiffer edge between the tips of the fingers while the rest of the membrane is more flexible is useful when picking up small objects between the adjacent fingers, for example a marble. According to one embodiment, web member 32 is formed from a rubber sheet having a textured or otherwise featured gripping surface on the palm side According to another embodiment the membrane fully encloses the space between the adjacent fingers and has a linear shape connecting the adjacent fingertips.

According to another non-limiting example, referring to FIG. 6, a diagram show a view from the inside-facing surface of a web member for use with robotic fingers incorporating multiple stiffening or grip enhancing members 38 in the region between fingers according to an illustrative embodiment of the invention. The stiffening or grip enhancing members 38 may be different in nature at and away from the ends of the web member to perform different functions such as stiffening, durability, and/or gripping enhancement. As will be readily appreciated by persons of ordinary skill in the art, other features may be incorporated into web member 32 to improve the grasp of the robotic fingers on specifically shaped items.

Figure 7:
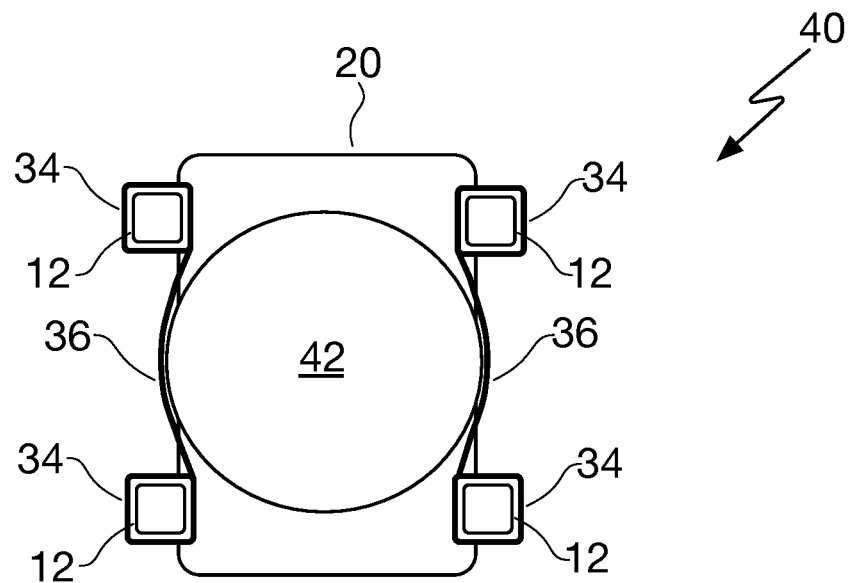
FIG. 7 is a top view of a robotic gripper including a web member between its fingers with a ball in its grasp.

FIG. 7 is a top view of a robotic gripper like robotic gripper 40 of FIG. 3 including a web member between its fingers with a ball in its grasp. Where elements of FIG. 7 are present in other drawing figures, they will be referred to using the same reference numerals used in the other drawing figures.

Distal finger segments comprising links 12 extend from gripper base 20 (through finger segments 12 not shown). A web member 32 is mounted on both sets of adjacent fingers by inserting the links 12 and 14 into the mounting sleeves 34 on the web member 32. The sheet or web 36 is shown extending between the distal link 12 of each set of adjacent fingers. The robotic gripper is seen grasping a ball 42. The sheet or web 36 spanning each set of adjacent robotic fingers can be seen conforming to the shape of the ball 42. FIG. 7 shows how the web member 32 wraps around the contours of the ball 42 to increase surface area coverage on the ball. This significantly improves the grasp of the robotic gripper.

Figure 8:
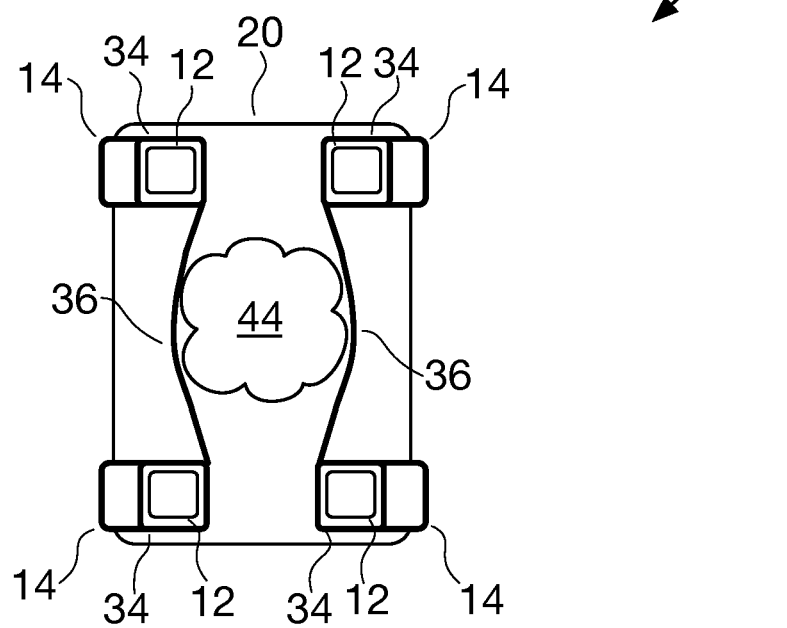
FIG. 8 is a top view of a robotic gripper including a web member between its fingers with a small object in its grasp.

FIG. 8 is a top view of a robotic gripper like robotic gripper 50 of FIG. 3 including a web member between its fingers. The robotic gripper 50 is shown grasping a small object 44 that is too small to be grasped by the links 12 and 14 of all four of its fingers 17. FIG. 8 shows that the web member 32 has wrapped the object for a reliable grasp.

The flexible web member 32 provides additional surface area to the robotic gripper and follows the surface contours of the object to significantly improve grasp stability and strength. The web member 32 can also provide stability to the fingers when wrapping around smaller objects that might tend to push the adjacent fingers away from each other around the object. These benefits come with a minimal increase in complexity, cost and power. The resulting grasp requires an equal or less amount of computational power than utilizing alternative "finger" based robotic grippers.

In an example implementation of a four-finger under-actuated robotic gripper with two pairs of opposing fingers, the web member 32 is stretched across one or more sets of adjacent fingers. In this case, a web is stretched across each pair of adjacent fingers. This example uses a single actuator to control all four under-actuated fingers. When the robotic gripper closes on a non-uniform shape, each finger closes and wraps around the object uniquely resulting in a solid four-finger grasp. In this example, the web member 32 additionally wraps around the object providing a substantial increase in contact between the object and the robotic gripper which provides additional stability and surface grip.

Another benefit of the web member 32 is when the size of the object is too small to be grasped by the adjacent fingers, it can be easily grasped using the web member 32 between the fingers. An example is using the four-finger robotic gripper described in FIGS. 1-3 above. If the adjacent fingers are spaced wide enough to pick up a large ball, such as a softball, then a small ball such as a ping-pong or golf ball can fall between the fingers. In this case the web member 32 will grasp the small ball even if all of the links of the four fingers are not in contact with the ball. In addition, the grasp will be very secure because the web member 32 will wrap around the ball.

Figure 9:
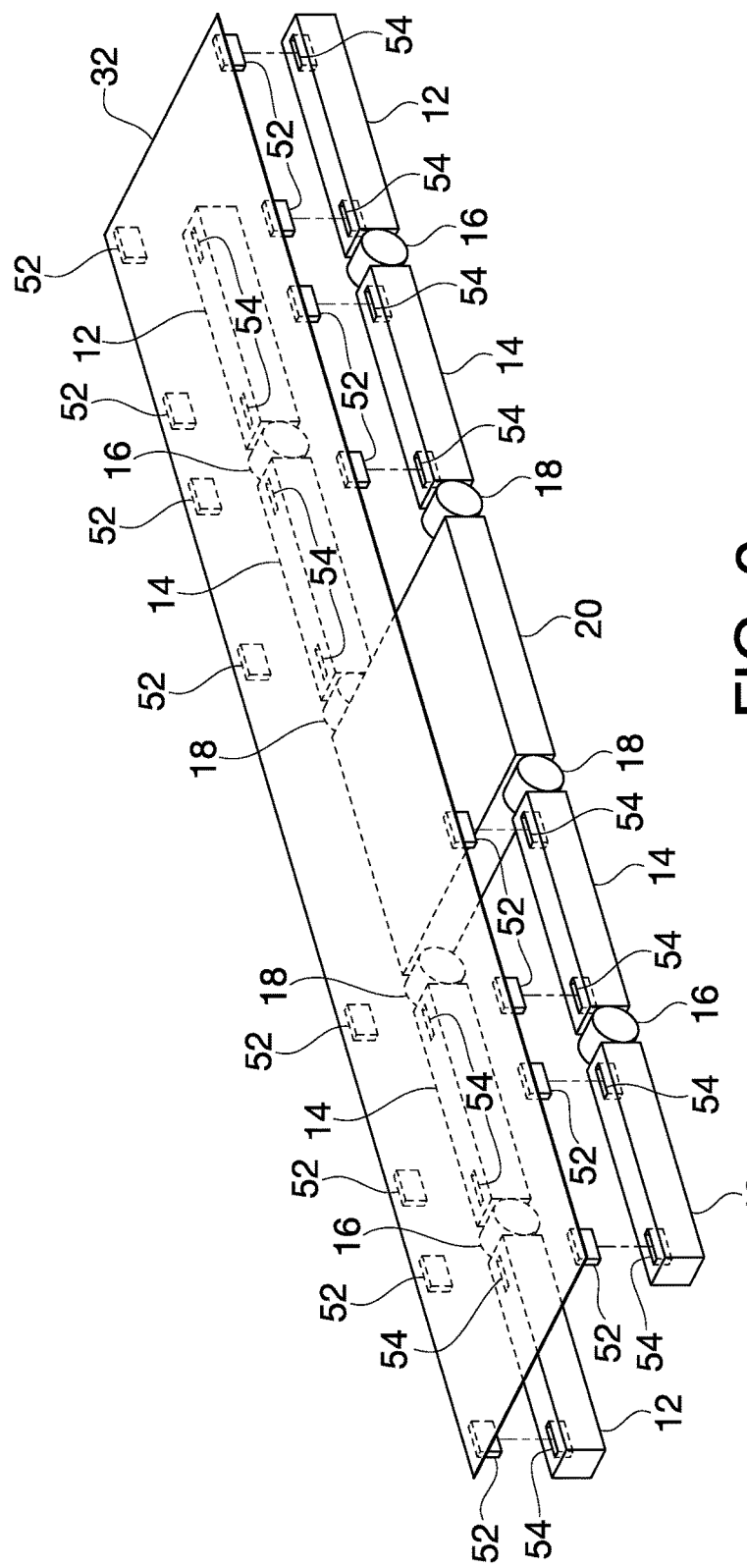
FIG. 9 is a diagram showing use of mating tabs and slots for attaching the web member to robotic fingers.
Figure 10:
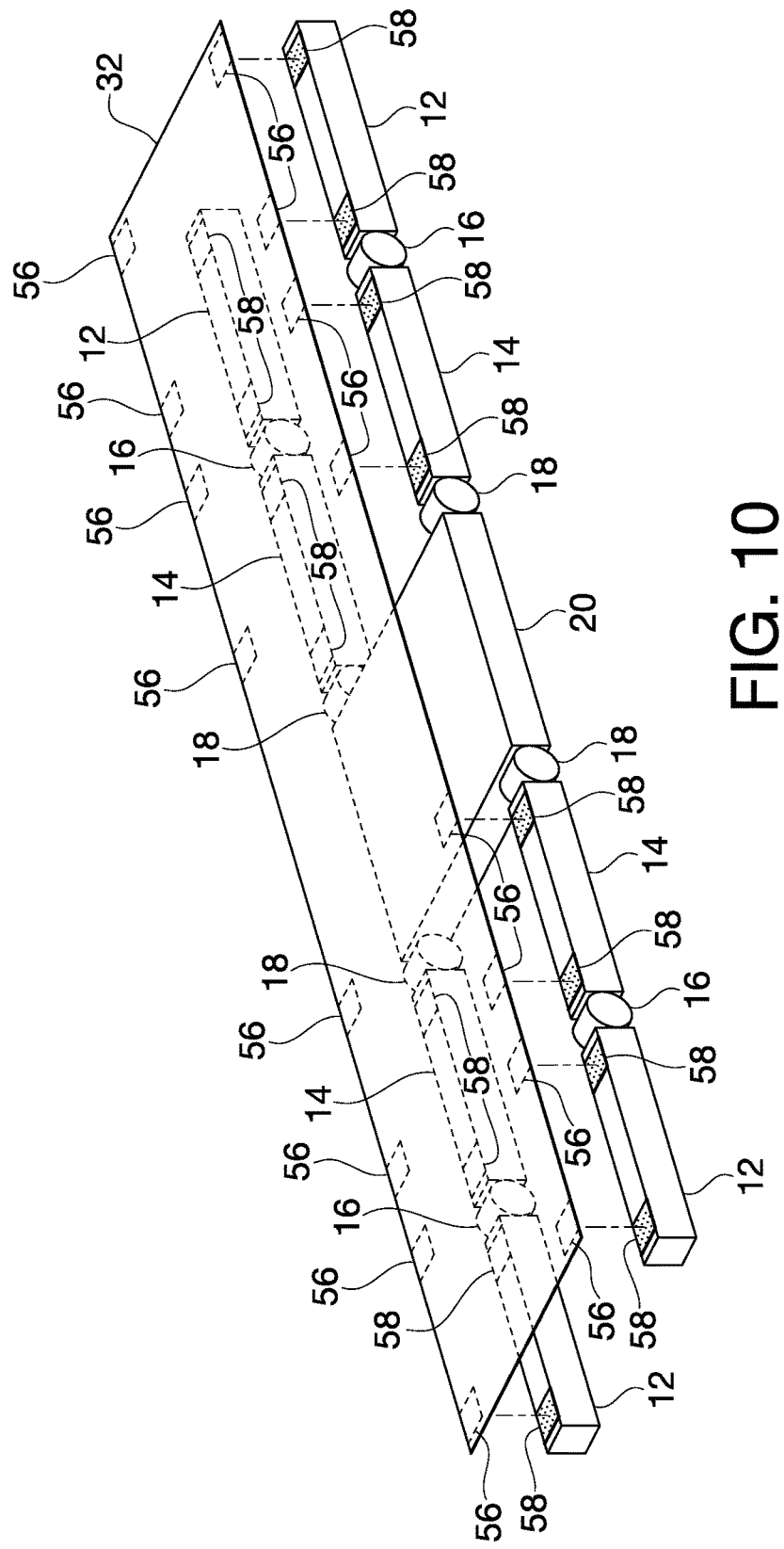
FIG. 10 is a diagram showing use of mating hook and loop fasteners for attaching the web member to robotic fingers.
Figure 11:
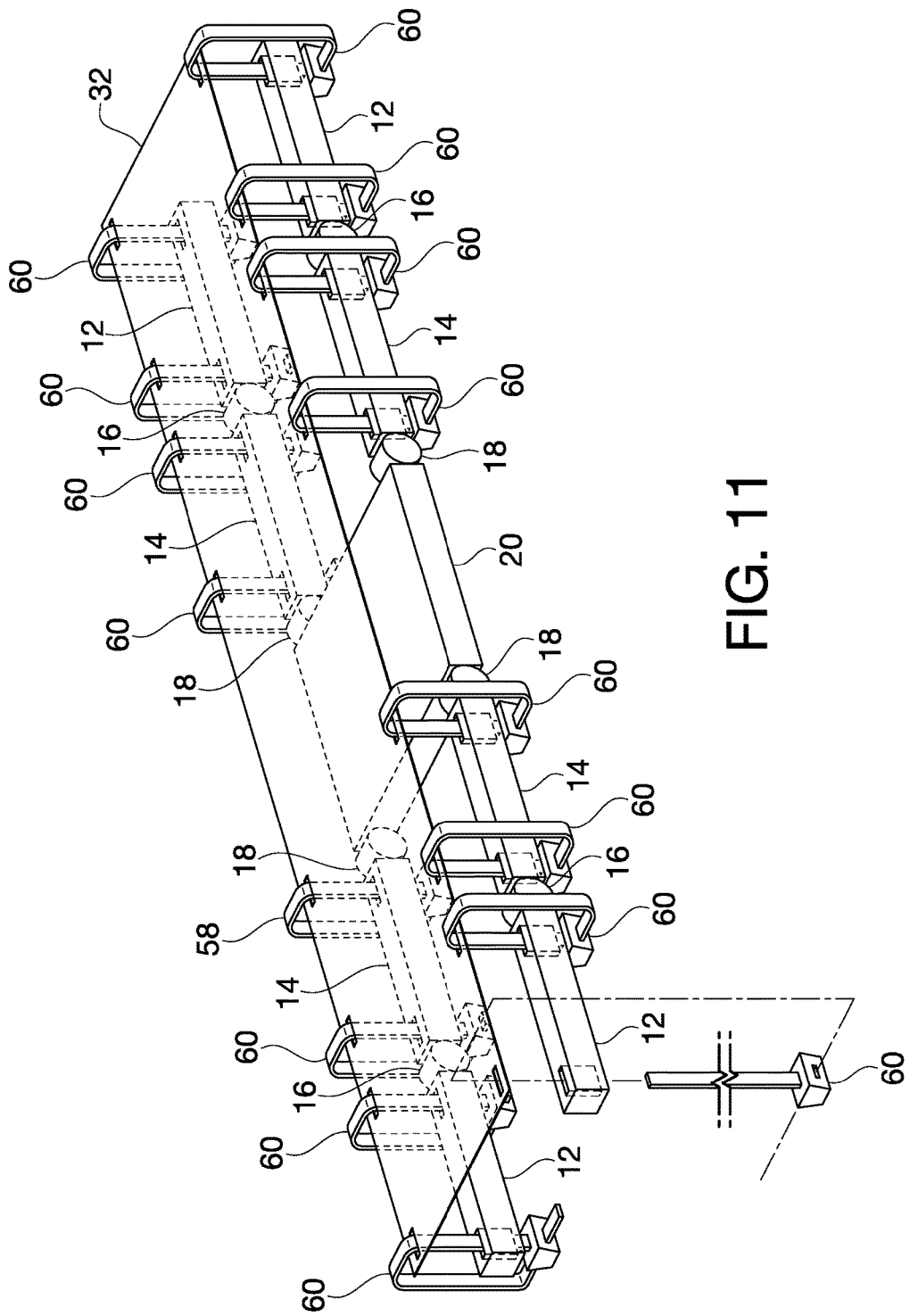
FIG. 11 is a diagram showing use of mating tie wraps for attaching the web member to robotic fingers.

As mentioned above with reference to FIG. 4, other attachment means, such as but not limited to mating tabs and slots, Velcro, zip ties, etc., may be used to fasten the web member 32 between the robotic fingers. According to this feature of the invention, the web member 32 is easily replaceable. FIG. 9 shows an embodiment of the invention where the web member 32 is attached to the robotic fingers using mating tabs 52 and slots 542. FIG. 10 shows an embodiment of the invention where the web member 32 is attached to the robotic fingers using mating hook and loop fasteners 56 and 58. Persons of ordinary skill in the art will appreciate that either of the tabs 52, slots 54, and the hook and the loop surfaces 56 and 58 can be mounted, respectively, either on the robotic finger and the web member 32. FIG. 11 shows an embodiment of the invention where the web member 32 is attached to the robotic fingers using tie wraps 60.

Although the invention has been described in detail by illustrative embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

What is claimed is:

1. A robotic gripper comprising:
   a gripper palm;
   a first pair of adjacent fingers extending from the palm, each finger in the first pair of fingers including a first link extending from the palm and coupled to a second link by a rotatable joint;
   a first web member having a web portion having a gripping face, the web portion extending between the first links of the first pair of adjacent fingers and further extending between at least portions of the second links of the first pair of adjacent fingers and
   means for attaching the first web member between the first pair of adjacent fingers.

2. The robotic gripper of claim 1 wherein the first web member extends between substantially the entirety of the second links of the first pair of adjacent fingers.

3. The robotic gripper of claim 1 wherein the first web member comprises a first web member disposed between a first sleeve enveloping a first one of the first pair of adjacent fingers and a second sleeve enveloping a second one of the first pair of the adjacent fingers.

4. The robotic gripper of claim 1 wherein the web portion is formed from one of an elastomeric material, a hypoallergenic material, a chemical resistant material, a synthetic gripping material, disposable latex gloves, a mesh fabric, a high-temperature resistant material, a material having a pliability and/or stiffness selected for the application it is to handle, a fabric sheet and an abrasive material.

5. The robotic gripper of claim 4 wherein the web portion is formed from a rubber sheet having a featured gripping surface on the gripping face.

6. The robotic gripper of claim 1 wherein the web portion includes features on its gripping face to enhance gripping and durability.

7. The robotic gripper of claim 1 wherein the web portion includes stiffening members disposed thereon.

8. The robotic gripper of claim 1, further comprising:
a second pair of adjacent fingers extending from the palm, each finger in the second pair of fingers including a third link extending from the palm and coupled to a fourth link by a rotatable joint.

9. The robotic gripper of claim 8, further comprising:
a second web member having a web portion having a gripping face, the web portion disposed between a first one of the second pair of adjacent fingers and a second one of the second pair of adjacent fingers, the web portion extending between the third links of the second pair of adjacent fingers and further extending between at least portions of the fourth links of the second pair of adjacent fingers and
means for attaching the second web member between the second pair of adjacent fingers.

10. The robotic gripper of claim 9, wherein:
the first pair of adjacent fingers extends from the palm at a first edge thereof; and
the second pair of adjacent fingers extends from the palm at a second edge thereof opposite the first edge.

11. The robotic gripper of claim 9 wherein the means for attaching the second web member includes one of tab-and-slot fasteners, hook-and-loop fasteners, and tie-wraps.

12. The robotic gripper of claim 1 wherein the means for attaching the first web member includes one of tab-and-slot fasteners, hook-and-loop fasteners, and tie-wraps.

* * * * *